United States Patent [19]

Abe et al.

[11] Patent Number: 4,490,507

[45] Date of Patent: Dec. 25, 1984

[54] PROCESS FOR PRODUCING RUBBER MODIFIED THERMOPLASTIC RESIN

[75] Inventors: Mitsuo Abe; Hisao Nagai, both of Yokkaichi; Akira Kamiya, Funabashi, all of Japan

[73] Assignee: Japan Synthetic Rubber Co., Ltd., Japan

[21] Appl. No.: 491,779

[22] Filed: May 5, 1983

[30] Foreign Application Priority Data

May 29, 1982 [JP] Japan .................................. 57-91523

[51] Int. Cl.$^3$ .................... C08F 255/06; C08F 255/04
[52] U.S. Cl. .................................. 525/263; 525/289; 525/290; 525/309; 525/310
[58] Field of Search ............... 525/289, 290, 309, 310, 525/263

[56] References Cited

U.S. PATENT DOCUMENTS

| | | | |
|---|---|---|---|
| 3,671,607 | 6/1972 | Lee ........................................ | 525/309 |
| 3,959,408 | 5/1976 | Yusa et al. ........................... | 525/310 |
| 3,984,496 | 10/1976 | Morimoto et al. .................. | 525/289 |
| 4,154,777 | 5/1979 | Shoji et al. .......................... | 525/289 |

*Primary Examiner*—Wilbert J. Briggs, Sr.

*Attorney, Agent, or Firm*—Oblon, Fisher, Spiva, McClelland & Maier

[57] ABSTRACT

A process for producing a rubber-modified thermoplastic resin by graft-copolymerizing a monomeric component composed of an aromatic alkenyl compound, an alkenyl cyanide compound and a methacrylic acid ester compound on an ethylene-propylene rubber, characterized in that the first reaction step, a monomer mixture composed of an aromatic alkenyl compound and an alkenyl cyanide compound or a mixture composed of these two compounds and 20% by weight or less of a methacrylic acid ester is graft-copolymerized on an ethylene-propylene rubber until the polymerization conversion reaches 30 to 70% by weight, and in the second reaction step, a methacrylic acid ester compound or a mixture of a methacrylic acid ester compound and 20% by weight or less of at least one other copolymerizable monomer is polymerized in the presence of the reaction mixture obtained in the first reaction step until the polymerization reaction is substantially completed. The rubber-modified thermoplastic resin obtained by this process is excellent in impact resistance, appearance of molded article and colorability.

15 Claims, No Drawings

PROCESS FOR PRODUCING RUBBER MODIFIED THERMOPLASTIC RESIN

This invention relates to a process for producing a rubber-modified thermoplastic resin which is excellent in weather resistance, impact resistance, appearance of molded article and colorability.

Graft copolymers obtained by graft-copolymerizing styrene and acrylonitrile or the like on ethylene-propylene rubbers typified by an ethylene-propylene-nonconjugated diene copolymer rubber (which is hereinafter referred to as EPDM in some cases) or rubber-reinforced resin composition (referred to hereinafter as AES resin) obtained by incorporating into said graft copolymers a copolymer of styrene and acrylonitrile or the like, are excellent in weather resistance and impact resistance, and their utilization as molding material in a wide field is expected.

However, such conventional AES resins, though certainly excellent in weather resistance and impact resistance, have the disadvantage that the molded articles obtained therefrom, when observed minutely, are found to have a pearl-like appearance.

It is also pointed out that these AES resins are inferior in colorability to diene rubber-based ABS resins belonging to the same rubber-reinforced resins, and especially lack brightness and depth of color when bright colored or raven-black molded articles are formed therefrom.

As a result of further studies and efforts for overcoming these problems, the present inventors have found that a prominent improvement in colorability and appearance of molded article can be attained by graft-copolymerizing a monomer mixture composed of an aromatic alkenyl compound, an alkenyl cyanide and a methacrylic acid ester compound on an ethylene-propylene rubber by a specific method.

It is known to use a methacrylic acid ester compound as one of the monomers to be graft-copolymerized on a diene rubber or an ethylene-propylene rubber, but this compound adversely affects the impact resistance, heat resistance, mechanical strength, thermal stability in molding, etc., and hence, said method has not been put into practice, except in some specific fields such as transparent ABS resins, and the like.

The present inventors, by contriving a specific way of use of methacrylic acid ester compounds, have succeeded in improving the appearance of molded article and the colorability of AES resins, both being the faults of AES resin, without impairing the weather resistance, impact resistance and heat resistance even when a methacrylic acid ester compound is used as one of the grafting monomers. In particular, this process has enabled brightness and depth to be imparted to bright colored or raven-black molded article.

The term "raven-black" used herein means a black color which has a high gloss and a feeling of transparency in appearance. Thus, when the term "raven-black resin" is used herein, it means physically a resin which causes little diffused reflection both on the surface and in the inside of the resin and has a low color value in the Munsell color system.

Since the resin of this invention is capable of obtaining raven-black color (with no specific coating work) which has hitherto been obtained only by applying a special coating onto a substrate such as a resin or the like, it can be used in not only a functional use as a weather resistant resin but also a design use excellent in colorability, such as raven-black or the like, and hence, the use area has becomes wider.

According to this invention, there is provided a process for producing a rubber-modified thermoplastic resin by graft-copolymerizing a monomeric component composed of an aromatic alkenyl compound, an alkenyl cyanide compound and a methacrylic acid ester compound with an ethylene-propylene rubber, characterized in that in the first reaction step, a monomer mixture composed of an aromatic alkenyl compound and an alkenyl cyanide compound or a mixture of the two monomers and 20% by weight or less of at least one other copolymerizable monomer is graft-copolymerized on an ethylene-propylene rubber until the polymerization conversion reaches 30 to 70% by weight, and in the second reaction step, a methacrylic acid ester compound or a mixture of a methacrylic acid ester compound and 20% by weight or less of at least one copolymerizable monomer is further graft-copolymerized on the reaction mixture obtained in the first reaction step until the polymerization reaction is substantially completed.

EPDMs are typical examples of the ethylene-propylene rubber usable in this invention, and preferred is an EPDM in which the ethylene to propylene molar ratio falls within the range of 5:1 to 1:3. Although the Mooney viscosity of the rubber used in this invention is not critical, it is desirable that such a rubber has a Mooney viscosity falling usually within the range of 20 to 100, preferably 25 to 70.

As the non-conjugated diene, there may be used alkenyl norbornenes, cyclic dienes, aliphatic dienes and the like, among which 5-ethylidene-2-norbonene and dicyclopentadiene are preferred. The amount of such a non-conjugated diene used in this invention, in terms of iodine value, falls usually within the range of 5 to 40.

The monomer used in the first reaction step of this invention is a mixture of an aromatic alkenyl compound such as styrene, α-methylstyrene, vinyltoluene, halogenated styrenes, or the like, and an alkenyl cyanide compound such as acrylonitrile, methacrylonitrile, or the like. A styrene-acrylonitrile mixture is most preferred. These two types of compounds are mixed in a weight ratio within the range of 80:20 to 40:60.

In the first reaction step, it is possible to use, together with the above-said compounds, at least one other copolymerizable monomer, preferably a methacrylic acid ester compound such as methyl methacrylate or the like, the amount thereof being preferably 20% by weight or less of the whole monomer mixture used in the first reaction step. If the amount of the methacrylic acid ester compound used becomes as large as more than 20% by weight, the impact resistance, heat resistance and the like are greatly deteriorated and the effect of this invention is not obtained.

The monomers used in the second reaction step are methacrylate compounds having a glass transition temperature not lower than room temperature such as methyl methacrylate, ethyl methacrylate, n-propyl methacrylate, isopropyl methacrylate and the like, among which methyl methacrylate, which has a high glass transition temperature, is preferred. Beside such methacrylate compounds, there may be additionally used an aromatic alkenyl compound such as styrene, an alkenyl cyanide compound such as acrylonitrile or a mixture thereof, the amount of said additional compound being preferably 20% by weight or less of the whole monomer mixture added in the second reaction step. However, if the said amount becomes as large as more than 20% by weight, the impact resistance, heat resistance and the like are greatly deteriorated, and the effect of this invention cannot be obtained.

The weight ratio of the mixture (a) of an aromatic alkenyl compound and an alkenyl cyanide compound to the methacrylate compound (b) in the whole monomers used in the first and second reaction steps of this invention is within the range of (a):(b) of 80:20 to 20:80, preferably 70:30 to 30:70.

The content of the rubber component in the rubber-modified thermoplastic resin which is the object of this invention may be varied depending upon the purpose of use of the resin, though in order not to impair the impact resistance of the resin composition, the rubber component content should fall within the range of 5 to 45% by weight, preferably 10 to 40% by weight.

The graft-copolymerization in this invention may be carried out by various polymerization methods such as bulk polymerization, bulk-suspension polymerization, solution polymerization, emulsion polymerization, etc., and may be performed either batchwise or continuously. However, no matter what polymerization method is used, it is essential to control the polymerization conversion in the first reaction step to a range of 30 to 70% by weight, preferably 40 to 60% by weight. If it is less than 30% by weight, the heat resistance of the product is greatly deteriorated, while if said polymerization conversion exceeds 70% by weight, the thermal stability during molding is adversely affected.

The graft-copolymerization reaction is allowed to proceed to a desired polymerization conversion in the first reaction step, and thereafter, the monomer for the second reaction step is added, after which the graft-copolymerization is further continued to substantially complete the polymerization reaction.

The optimum polymerization method for practicing this invention is a solution polymerization using an organic peroxide as a catalyst.

The amount of the solvent used for such a solution polymerization is preferably 50 to 200 parts by weight in total per 100 parts by weight of the sum of the monomer mixture and rubber.

The solvent used in the solution polymerization is desirably one which can dissolve EPDM uniformly, and as said solvent, there may be used aromatic hydrocarbons and haglogenated aromatic hydrocarbons, specifically benzene, toluene, ethylbenzene, chlorobenzene and the like.

As the polymerization catalyst, there may be used the conventional radical catalysts, for example, organic peroxides such as ketone peroxide, dialkyl peroxide, diacyl peroxide, peroxy esters, hydroperoxides, and the like.

The polymerization temperature used for the reaction of this invention is desirably within a range of 50° to 150° C.

The effect of this invention can also be obtained by the so-called graft-blending method in which the graft-copolymer obtained by the process of this invention is blended with a separately prepared polymer or copolymer of at least one monomer selected from the above-mentioned momoners.

Preferred examples of the polymers or copolymers that can be blended with the resin of this invention are polystyrene, polymethyl methacrylate, methyl methacrylate-styrene copolymer, styrene-acrylonitrile copolymer and the like, among which methyl methacrylate polymers are desirable as they can provide very excellent raven-black color, and in this sense, polymethyl methacrylate is especially preferred.

This invention will be described in more detail below referring to Examples, but it is to be understood that this invention is not limited to the Examples.

EXAMPLE 1

| | |
|---|---|
| JSR EP 65-X* (manufactured by JAPAN E.P. RUBBER) | 20 parts by weight |
| Styrene (ST) | 32 parts by weight |
| Acrylonitrile (AN) | 13 parts by weight |
| Toluene | 100 parts by weight |

*An ethylene-propylene-non-conjugated diene rubber in which ethylidene norbornene is used as the non-conjugated diene and which has an iodine value of 29 and a Mooney viscosity of 74.)

The above materials were fed to a 10-liter stainless steel reactor equipped with a paddle agitator, and the mixture was agitated at 50° C. until the rubber was perfectly dissolved. Then, 0.1 part by weight of tert-dodecylmercaptan and 0.2 part by weight of dicumyl peroxide were added and the resulting mixture was subjected to the polymerization at 100° C. for 3 hours until the polymerization conversion reached 55% by weight. To the reaction mixture was then added 35 parts by weight of methyl methacrylate (MMA) and the resulting mixture was subjected to polymerization at 100° C. for a further 5 hours until a polymerization conversion of 95% by weight, that is, the polymerization was substantially completed.

The reaction mixture thus obtained was desolvated in the conventional manner, and dried, after which 0.2 part by weight of 2,2'-methylenebis-(4-ethyl-6-tert-butylphenol) was added thereto. The resulting mixture was pelletized by means of a 40 mm extruder (200° C.). The pellets thus obtained were shaped into test pieces by a 50-Z injection machine (230° C.) and their physical properties were measured.

Also, the following blend was prepared by using the resin obtained and passed through said extruder to form colored pellets, which were then injection molded into plates for color tone evaluation.

| Red recipe | Resin | 100 | parts by weight |
|---|---|---|---|
| | Red iron oxide | 1.0 | " |
| | Calcium stearate | 0.5 | " |

The results obtained are shown in Table 2.

EXAMPLES 2 AND 3

The same procedure as in Example 1 was repeated except that the amounts of styrene and acrylonitrile used in the first reaction step and the amount of methyl methacrylate used in the second reaction step were changed.

COMPARATIVE EXAMPLE 1

The same procedure as in Example 1 was repeated, except that only styrene and acrylontrile were used as monomers and the polymerization was completed in the first reaction step.

COMPARATIVE EXAMPLE 2

The same procedure as in Example 1 was repeated, except that a mixture of styrene, acrylonitrile and methyl methacrylate was used as the monomer in the first reaction step, and polymerization was completed only in the first reaction step.

COMPARATIVE EXAMPLES 3 AND 4

The same procedure as in Example 1 was repeated, except that the polymerization conversion in the first reaction step was changed by varying the polymerization time.

EXAMPLE 4

The same procedure as in Example 1 was repeated, except that methyl methacrylate was used together with styrene and acrylonitrile as the monomer in the first reaction step.

EXAMPLE 5

The same procedure as in Example 1 was repeated, except that styrene and acrylonitrile were used together with methyl methacrylate as the monomer in the second reaction step.

EXAMPLE 6

The same procedure as in Example 1 was repeated, except that JSR EP 85-X (an ethylene-propylene-non-conjugated diene rubber in which the non-conjugated diene is dicyctopentadiene and which has an iodine value of 12 and a Mooney viscosity of 44) was used as EPDM.

EXAMPLE 7

| | |
|---|---|
| JSR EP 65-X | 40 parts by weight |
| Styrene | 15 parts by weight |
| Acrylonitrile | 5 parts by weight |
| Toluene | 200 parts by weight |

The above materials were fed to a 10-liter stainless steel reactor having a paddle agitator and agitated at 50° C. until the rubber was perfectly dissolved. Then, 0.4 part by weight of dicumyl peroxide was added thereto and the resulting mixture was further subjected to polymerization at 100° C. for 3 hours to render the polymerization conversion 35% by weight.

To the reaction mixture thus obtained was added 40 parts by weight of methyl methacrylate and the resulting mixture was further subjected to polymerization at 100° C. for 5 hours to render the polymerization conversion 90% by weight, that is, the polymerization was completed.

The resulting reaction product was desolvated in the conventional manner and dried, after which 0.4 part by weight of 2,2'-methylenebis-(4-ethyl-6-tert-butylphenol) was added thereto, and the resulting mixture was then pelletized by means of a 40 mm extruder (200° C.).

The graft-copolymer thus obtained was blended with an acrylonitrile-styrene copolymer resin (LITAC-A 120-PC produced by MITSUI-TOATSU) in a weight ratio of 50:50 and the blend was again pelletized by means of a 40 mm extruder and then shaped into test pieces by a 50-Z injection machine, and the physical properties of the test pieces were measured. The results obtained are shown in Table 2.

EXAMPLE 8

A continuous solution polymerization was carried out under the conditions shown in Table 1 by using a polymerization reaction apparatus in which three sets of polymerizers were connected by an overflow system, each of said polymerizers having an internal capacity of 30 liters and being provided with a ribbon blade. The reaction materials are shown in parts by weight in Table 2.

TABLE 1

| | Feed rate (g/hr) | Polymerization temperature (°C.) | Agitator speed (rpm) | Polymerization conversion (wt %) |
|---|---|---|---|---|
| First polymerizer | | 100 | 60 | 60 |
| EP 65-X | 1055 | | | |
| Styrene | 1687 | | | |
| Acrylonitrile | 685 | | | |
| Toluene | 5273 | These were fed in the form of a homogeneous solution at 50° C. | | |
| t-dodecylmercaptan | 5.3 | | | |
| Dicumyl peroxide | 10.5 | | | |
| Second polymerizer | | 100 | 60 | 60 |
| Methyl methacrylate | 1845 | | | |
| Third polymerizer | — | 100 | 60 | 90 |

The polymerization reaction was conducted continuously for 60 hours, and the reaction mixture at the end of the reaction was recovered in the same manner as in Example 1 and subjected to evaluation. The results obtained are shown in Table 2. The "polymerization time" in Table 2 is the approximate value of the average retention time when the liquid specific gravity was assumed to be 0.87 g/ml.

EXAMPLE 9

The same procedure as in Example 1 was repeated, except that the amounts of styrene and acrylonitrile charged in the first reaction step were varied. The results obtained are shown in Table 2.

EXAMPLE 10

The same procedure as in Example 1 was repeated, except that alpha-methylstyrene (α-MeST) was substituted for the styrene in the first reaction step. The results obtained are shown in Table 2.

EXAMPLES 11 AND 12

The procedure as in Example 1 was repeated, except that the amounts of styrene and acrylonitrile charged in the first reaction step were varied. The results obtained are shown in Table 2.

TABLE 2

Composition of charge and polymerization

TABLE 2-continued

| | EPDM | | First reaction step | | | | | Second reaction step | | | | | |
|---|---|---|---|---|---|---|---|---|---|---|---|---|---|
| | | Amount | ST | AN | MMA | Polymerization | | ST | AN | MMA | Polymerization | | Fluidity |
| | Type | (part by wt.) | (part by wt.) | (part by wt.) | (part by wt.) | Time (hr) | Conversion (% by wt.) | (part by wt.) | (part by wt.) | (part by wt.) | Time (hr) | Conversion (% by wt.) | (× 10⁻³ ml/sec) |
| EXAMPLE 1 | EP65X | 20 | 32 | 13 | — | 3 | 55 | — | — | 35 | 5 | 95 | 14 |
| EXAMPLE 2 | EP65X | 20 | 42 | 18 | — | 3 | 70 | — | — | 20 | 5 | 95 | 12 |
| EXAMPLE 3 | EP65X | 20 | 15 | 5 | — | 3 | 30 | — | — | 60 | 5 | 85 | 18 |
| EXAMPLE 4 | EP65X | 20 | 32 | 13 | 10 | 3 | 50 | — | — | 25 | 5 | 90 | 15 |
| EXAMPLE 5 | EP65X | 20 | 27 | 10 | — | 3 | 45 | 5 | 3 | 35 | 5 | 90 | 15 |
| EXAMPLE 6 | EP85X | 20 | 32 | 13 | — | 3 | 55 | — | — | 35 | 5 | 90 | 16 |
| EXAMPLE 7 | EP65X | 40 | 15 | 5 | — | 3 | 35 | — | — | 40 | 5 | 90 | 13 |
| EXAMPLE 8 | EP65X | 20 | 32 | 13 | — | 3 | 60 | — | — | 35 | 2.5/2.5 | 90 | 15 |
| EXAMPLE 9 | EP65X | 20 | 25 | 20 | — | 3 | 60 | — | — | 35 | 5 | 95 | 8 |
| EXAMPLE 10 | EP65X | 20 | 32 | 13 | — | 8 | 55 | — | — | 35 | 15 | 95 | 10 |
| EXAMPLE 11 | EP65X | 20 | 38 | 7 | — | 5 | 55 | — | — | 35 | 5 | 95 | 8 |
| EXAMPLE 12 | EP65X | 20 | 20 | 25 | — | 3 | 60 | — | — | 35 | 5 | 95 | 16 |
| COMPARATIVE EXAMPLE 1 | EP65X | 20 | 55 | 25 | — | 8 | 95 | — | — | — | — | — | 10 |
| COMPARATIVE EXAMPLE 2 | EP65X | 20 | 32 | 13 | 35 | 8 | 90 | — | — | — | — | — | 15 |
| COMPARATIVE EXAMPLE 3 | EP65X | 20 | 32 | 13 | — | 6 | 75 | — | — | 35 | 2 | 90 | 10 |
| COMPARATIVE EXAMPLE 4 | EP65X | 20 | 32 | 13 | — | 1 | 25 | — | — | 35 | 7 | 90 | 15 |

| | Composition of charge and polymerization conversion | | | | |
|---|---|---|---|---|---|
| | Izot impact strength (kg · cm/cm) | Heat deformation temperature (°C.) | Pearl-like appearance | Vividness of color | Thermal stability |
| EXAMPLE 1 | 37 | 84 | ○ | ○ | ○ |
| EXAMPLE 2 | 40 | 86 | △ | △ | ○ |
| EXAMPLE 3 | 30 | 80 | ○ | ○ | ○ |
| EXAMPLE 4 | 35 | 82 | ○ | ○ | ○ |
| EXAMPLE 5 | 35 | 82 | ○ | ○ | ○ |
| EXAMPLE 6 | 35 | 85 | ○ | ○ | ○ |
| EXAMPLE 7 | 40 | 87 | ○ | ○ | ○ |
| EXAMPLE 8 | 35 | 85 | ○ | ○ | ○ |
| EXAMPLE 9 | 42 | 84 | ○ | ○ | ○ |
| EXAMPLE 10 | 30 | 95 | ○ | ○ | ○ |
| EXAMPLE 11 | 20 | 82 | ○ | ○ | ○ |
| EXAMPLE 12 | 40 | 82 | ○ | △ | x |
| COMPARATIVE EXAMPLE 1 | 40 | 89 | x | x | ○ |
| COMPARATIVE EXAMPLE 2 | 35 | 76 | △ | ○ | ○ |
| COMPARATIVE EXAMPLE 3 | 25 | 85 | ○ | ○ | x |
| COMPARATIVE EXAMPLE 4 | 35 | 77 | △ | ○ | ○ |

TABLE 2-continued

EXAMPLE 4

NOTE:
JSR EP 65-X: Trade name of Japan E.P. Rubber for an ethylene-propylene-non-conjugated diene rubber in which the non-conjugated diene is ethylidene norbornene and which has an iodine value of 29 and a Mooney viscosity ($ML_{1+4}$ (100° C.)) of 74.
JSR EP 85-X: Trade name of Japan E.P. Rubber for an ethylene-propylene-non-conjugated diene rubber in which the non-conjugated diene is dicyclopentadiene and which has an iodine value of 12 and a Mooney viscosity ($ML_{1+4}$ (100° C.)) of 44.
Fluidity: Measured by KOKA type flow tester at 200° C. at 30 kg/cm². Efflux rate from 1 φ × 2L mm nozzle.
Izod impact strength: Measured according to ASTM D-256-56. (cross-section: ¼ × ½ in., notched)
Heat deformation temperature: Measured according to ASTM D-648. (¼ in., 264 psi; no annealing)
Pearl-like appearance: Judged by visual observation of test piece.
Vividness of color: Chroma of test piece was judged with the naked eye.
Thermal stability: Test piece was formed by a 50-Z injection machine (280° C.) and silver streaks on the test piece were observed with the naked eye.
In Table 2, the symbols "o", "" and "x" have the following meanings:
(1) Pearl-like appearance
o: no pearl-like appearance
Δ: slight pearl-like appearance
x: definite pearl-like appearance
(2) Vividness of color
o: extremely vivid
Δ: vivid
x: observable turbidity
(3) Thermal stability
o: no silver streaks
x: silver streaks observed As can be seen from the results of Examples 1–8 shown in Table 2, there can be obtained an AES resin markedly improved in appearance of molded article and colorability and also well balanced in physical properties by graft-copolymerizing a monomer mixture composed of an aromatic alkenyl compound, an alkenyl cyanide compound and a methacrylic acid ester compound on EPDM according to the process of this invention.

On the other hand, the AES resins prepared without using the methacrylic acid ester compound for graft-copolymerization as exemplified in Comparative Example 1 are poor in appearance of molded article and colorability, though balanced in physical properties. On the other hand, even when a methacrylic acid ester compound is used for graft-copolymerization, if the polymerization reaction is accomplished by a single step as in Comparative Example 2, the resulting resins are found to be unacceptably low in Izod impact strength and heat deformation temperature although improved in appearance of molded article and colorability.

Also, if the polymerization conversion in the first reaction step is outside the range of this invention as in Comparative Examples 3 and 4, the products obtained are inferior in thermal stability and also balance in physical properties.

EXAMPLE 13

There were obtained the resin compositions shown in Table 3 by using the following recipe, and the color values of these compositions were measured. The results obtained are also shown in Table 3.

| Recipe | |
| --- | --- |
| Resin | 100 parts by weight |
| Carbon black | 0.5 parts by weight |
| Calcium stearate | 0.3 parts by weight |

Color value was measured by a color difference meter and indicated by the values on the Munsell color system. The smaller the value, the better the raven-black color.

TABLE 3

| | Run No. | | | | | | |
| --- | --- | --- | --- | --- | --- | --- | --- |
| | Example | | | | | | Comp. Ex. |
| Resin | 1 | 2 | 3 | 4 | 5 | 6 | 7 |
| AES resin parts by wt. | | | | | | | 100 |
| MAES resin parts by wt. | 100 | 50 | 50 | 50 | 50 | 50 | |
| PMMA resin parts by wt. | | 50 | | 25 | 25 | | |
| PMS resin parts by wt. | | | 50 | 25 | | | 25 |
| PAS resin parts by wt. | | | | | 25 | 25 | |
| Black-blended color value | 1.3 | 0.7 | 0.9 | 0.7 | 0.9 | 1.0 | 2.0 |

NOTE:
AES resin: graft-copolymer of Comparative Example 1
MAES resin: graft-copolymer of Example 7 (resin of this invention)
PMMA resin: methyl methacrylate polymer (Acrypet M manufactured by MITSUBISHI RAYON)
PMS resin: methyl methacrylate-styrene copolymer (Cevian MAS-30 manufactured by DAICELL CHEMICAL INDUSTRIES)
PAS resin: styrene-acrylonitrile copolymer (Litac-A 120 PC manufactured by MITSUI-TOATSU)

It can be seen from the results shown in Table 3 that in the case of raven-black recipe in which carbon black is blended, the resin of this invention is excellent (see Run No. 1) and the compositions formed by blending a methyl methacrylate resin with the resin of this invention are further excellent (see Run Nos. 2–6), among which the compositions formed by blending polymethyl methacrylate (Run Nos. 2 and 4) are especially excellent.

What is claimed is:

1. A process for producing a rubber-modified thermoplastic resin by graft-copolymerizing a monomeric component composed of an aromatic alkenyl compound, an alkenyl cyanide compound and a methacrylic acid ester compound on an ethylene-propylene rubber, which comprises, in the first reaction step, graft-copolymerizing a monomer mixture consisting of at least one aromatic alkenyl compound and at least one alkenyl cyanide compound or a mixture thereof with 20% by weight or less, based on the weight of said monomer mixture, of at least one other copolymerizable monomer on said ethylene-propylene rubber until the polymerization conversion of said monomer mixture reaches 30 to 70% by weight, and in the second reaction step, polymerizing a methacrylic acid ester compound or a mixture thereof with 20% by weight or less, based on all monomers added in the second step, of at least one other copolymerizable monomer in the presence of the reaction mixture obtained in the first reaction step until the polymerization reaction is substantially completed.

2. A process according to claim 1, wherein the monomer mixture in the first reaction step is a mixture of an aromatic alkenyl compound selected from the group consisting of styrene, α-methylstyrene, vinyltoluene and a halogenated styrene and an alkenyl cyanide compound selected from the group consisting of acrylonitrile and methacrylonitrile.

3. A process according to claim 1, wherein the monomer mixture in the first reaction step is a mixture of styrene and acrylonitrile.

4. A process according to claim 3, wherein the weight ratio of styrene to acrylonitrile is 80:20 to 40:60.

5. A process according to claim 1, wherein the said at least one other copolymerizable monomer used in the first reaction step is selected from methacrylic acid ester compounds.

6. A process according to claim 1, wherein the methacrylic acid ester compound used in the second reaction step is such that the polymer thereof has a glass transition point not lower than room temperature.

7. A process according to claim 6, wherein the methacrylic acid ester compound is at least one compound selected from the group consisting of methyl methacrylate, ethyl methacrylate and isopropyl methacrylate.

8. A process according to claim 1, wherein the said at least one other copolymerizable monomer used in the second reaction step is selected from the group consisting of aromatic alkenyl compounds and alkenyl cyanide compounds.

9. A process according to claim 1, wherein the weight ratio of (a) the sum of the aromatic alkenyl compound and alkenyl cyanide compound to (b) the sum of the methacrylate compound in the whole monomer used in the first and second reaction steps is 80:20 to 20:80.

10. A process according to claim 1, wherein the content of the rubber component in the rubber-modified thermoplastic resin is 5 to 45% by weight.

11. A process according to claim 10, wherein said rubber component content is 10 to 40% by weight.

12. A process according to claim 1, wherein the polymerization conversion in the first reaction step is 40 to 60% by weight.

13. A process according to claim 1, wherein the polymerization is carried out in a solvent with a radical catalyst at a temperature within a range of 50° to 150° C.

14. A process according to claim 13, wherein the solvent is an aromatic hydrocarbon or a halogenated aromatic hydrocarbon, and the catalyst is an organic peroxide.

15. A rubber-modified thermoplastic resin obtained by the process of claim 1.

* * * * *